3,303,187
RECOVERY OF TIGOGENIN ACETATE AND 5α-16-PREGNENE - 3β - OL - 20 - ONE FROM NATURAL PLANT SOURCES
Martin Rubin, 3218 Pauline Drive, Chevy Chase, Md. 20015
No Drawing. Filed Feb. 26, 1965, Ser. No. 435,698
7 Claims. (Cl. 260—239.55)

The present invention relates to a new procedure for preparing from natural plan source a steroid intermediate which can be described as 5α-16-pregnene-3b-ol-20-one.

Potentially this steroid is valuable as a key intermediate in the preparation of many important steroids. Thus it may be readily degraded in high yield by procedures described in U.S. Patent 2,335,616 to yield 5α-androstan-3β-ol-17-one, which steroid has been converted conveniently and in high yield to 1,4-androstandien-3, 17-dione as described by Hershberg, Rubin and Schwenk; J. Org. Chem. 15 292 1940). The diendione may be converted to estrone by the use of the procedure described in Patent 2,594,349. Estrone is important in its own right and as an intermediate for the preparation of other important steroids.

Additionally, 5α-16-pregnene-3β-ol-20-one can serve as an intermediate for the production of the corticoid steroids. Thus by reaction with the methyl grignard reagent, this compound may be converted to the 16α methyl derivative and by well known steps to the important 16α-methyl corticosteroid known as dexamethasone.

The same starting compound may be modified readily to produce cortisone, hydrocortisone, prednisone and prednisolone. These processes have been described in the Applezweig text entitled, "Steroid Drug," published by McGraw-Hill Book Company, 1962. The compound itself has been known for many years, having been described by Klyne et al. in Biochem. J. 39, XLV (1945) and 42 i (1948).

Despite the potential which this compound has as a key intermediate, it is not available from any source except as an expensive laboratory curiosity. The reason for it nonavailability apparently is the hitherto expensive procedures required to prepare the compound.

The procedure of the present invention provides a relatively simple, inexpensive technique for preparation of the 5α-16-pregnene-3β-ol-20-one from available plant starting materials in high yield, high purity and at low cost.

It has now been found that widely cultivated fiber bearing plants such as for example *Agave sisalina* can serve conveniently as source material for this invention. Briefly the present procedure involves obtaining the plant juices during the normal course of decorticating the leaves of the plant, screening the juices to remove extraneous matter such as short fibers, and then permitting the juices to ferment and autolyze under ambient conditions for extended periods of time, e.g., 3–9 weeks. Since it is well known that a high steroidal content residue can be obtained in this manner from these juices, the present procedure can be considered to start with a conventionally obtainable plant source material.

Starting with such a plant source material, the present procedure involves suspending and extracting same with nitrabenzene either directly from the plant material or indirectly by means of a preliminary extraction step wherein a halogenated hydrocarbon selected from the group consisting of ethylene dichloride trichlorethylene, perchloroethylene and mixtures thereof is employed as the primary extractant. An advantage of commencing by extracting plant source material with either the halogenated hydrocarbon solvent or nitrobenzene is that the sun dried leaf juice sediment has a water content in the range of 0–40%, usually about 20%, and a water removal step can be carried out concomitantly with the extraction by extracting under reflux conditions in a system wherein the condensed vapors are stratified and the water layer discarded while the solvent layer is returned to the extraction step.

In any event the nitrobenzene solution of steroid values can, without further purification, be directly treated with hydrazine hydrate to convert any carbonyl groups present in the steroid molecules to the hydrazone derivative, such groups having been found to be significantly present in the steroid impurities. Thereafter the mixture is treated with a solution of sodium or potassium hydroxide in aqueous diethylene glycol and the nitrobenzene mixture stirred and heated under conditions which azeotropically remove excess unreacted hydrazine and the water until distillation temperatures of 210° C. are obtained. Thereafter the mixture is heated for several hours under total reflux to complete conversion of the hydrazone to the hydrocarbon.

After cooling water is added to the nitrobenzene solution (with stirring) and after stratification, the aqueous alkaline layer drawn off and discarded. A noteworthy advantage of the present procedure is that water washing at this stage results in a caustic aqueous layer containing substantial quantities of diethylene glycol, a mixture which serves very well to remove the fatty acid and pigment impurities which up to this point have been carried along from the initial extract phase. Thus, while it may be desirable to preliminarily treat the extract with aqueous caustic with or without the presence of an alcohol selected from the group consisting of methanol, ethanol, ethylene glycol, and diethylene glycol in order to remove fats and pigments, it has been found in practice that presence of these impurities does not materially interfere with removal of carbonyl groups. The inherent presence of essentially the same washing medium advantageously allows removal of the fats and pigments to be deferred this far in the overall process.

In any event following removal of the aqueous caustic, the nitrobenzene solution may be dewatered by azeotropic distillation of the water, and the now anhydrous solution then treated with a $C_2$–$C_{12}$ carbon aliphatic acid anhydride at elevated temperatures, e.g., 180–200° C. The acylation is a point of departure for the production of alternative materials. Thus if it is desired to produce tigogenin acetate as a product of the present procedure, a slightly lower quantity of acetic anhydride is employed and lower reaction temperatures may be employed, e.g., 100–120° C., followed by steam distillation to remove acetic acid, the nitrobenzene, and any unreacted acetic anhydride. Whereupon the residue can be extracted with ethyl acetate and appropriately recrystallized to yield tigogenin acetate.

However, to produce directly the 5α-16-pregnene-3β-ol-20-one the higher reaction temperatures are desirable and a substantial excess of acyl anhydride should be employed.

The acylated nitrobenzene solution is cooled, cold water added with vigorous and continued stirring with additional cooling as necessary. When the mixture is at approximately 30° C. a solution of chromic acid and acetic acid is slowly added (and the stirring continued for several hours after the addition has been completed). Thereafter the nitrobenzene and acetic acid are removed by steam distillation of the mixture. The steam distillation residue is taken up in ethyl acetate. The ethyl acetate extract is washed first with aqueous sodium chloride then with aqueous sodium carbonate, thereafter with additional aqueous salt solution until the washes are no longer alkaline. The ethyl acetate extract is concentrated under vauco and the resulting (brown gummy) residue refluxed for one hour in caustic solution of n-butyl alcohol. After removal of the butyl alcohol in vacuo, extraction of the residual solid with methanol and recrystallization therefrom produces a relatively pure product of $5\alpha$-16-pregnene-$3\beta$-ol-20-one.

Mention has already been made of how the present procedure may be halted, so to speak, at an intermediate point to recover tigogenin acetate. For this acetic anhydride must be the acylation reagent. However, since even the tigogenin acetate is usually reconverted back to tigogenin and as above described the $5\alpha$-16-pregnene-$3\beta$-ol-20-one involves an ultimate hydrolysis back to the free alcohol, acylation can be effected with other than acetic anhydride. Actually any anhydride of a 2–12 carbon fatty acid can be employed in place of the acetic anhydride. Some of the fatty acids at the higher end of the above given range are particularly advantageous since their anhydride can largely be formed in situ during the course of the acylation reactions. Thus for example a mixture of n-octanoic acid and n-octanoic anhydride can be employed when the acylation reactions are effected under refluxing conditions with water removal from the condensate.

For further understanding of the present invention the following specific examples are herein presented.

*Example I*

The juice obtained during the course of the normal decortication of *Agave sisalina* leaves for the production of sisal fiber was screened to remove pulp and small fiber particles. The collected cooloidal juice was permitted to stand at ambient conditions for a month during which period autolysis and fermentation occurred, the juice separating into a clear upper liquid phase and a bottom sludge (the sludge containing the steroid values). After the sludge was removed from the liquid by centrifuging in a Sharples DV-2 centrifuge and sun dried two weeks, 1 kg. dry (1.25 kg. of 20% moisture content) of residue was suspended in 2 liters of nitrobenzene and the extract mixture heated with stirring until all of the water had been azeotropically entrained, the solvent being returned to the extract mixture (by use of a Dean-stark trap). The warm nitrobenzene solution was filtered to remove the insoluble residue and the filtrate placed in a 3 liter flask to which was added 25 ml. of hydrazine hydrate. The solution was stirred and heated at 85–120° C. for 45 minutes and thereafter cooled to 75° C., and a solution of 25 g. of sodium hydroxide in 200 ml. of 50% water–50% diethylene glycol added. Thereafter the mixture was stirred and heated to effect simultaneous removal of excess hydrazine and water by azeotropic entrainment with return of the condensed nitrobenzene to the reaction solution. The heating and stirring was continued until the solution temperature reached 210° C., and thereafter the mixture refluxed for 4 hours. The mixture was cooled to 75° C. and 500 ml. of cold water slowly added with vigorous stirring. The stirring was then halted and the aqueous alkaline layer drawn off and discarded.

Thereafter the nitrobenzene solution was again dewatered by azeotropic entrainment of the water and 150 ml. of acetic anhydride added. The mixture was stirred and heated at 180–200° C. for a period of 5 hours, after which the solution was cooled to below about 50° C., and 300 ml. of cold water introduced with vigorous stirring, the stirring being continued for one hour.

To the resultant mixture (after cooling to 30° C.) was added (with stirring) a solution of 2.1 g. of chromic acid in 10 ml. of water and 25 ml. of acetice acid gradually over a two-hour period. The stirring was continued for an additional hour, and the entire mixture steam distilled to remove the nitrobenzene and other volatile materials. Thereafter the residual mixture was cooled to room temperature and extracted with 2 liters of ethyl acetate. The ethyl acetate extract was washed twice with 100 ml. portions of 10% sodium chloride solution, twice with 100 ml. portions of 5% sodium carbonate solution, and then twice with 100 ml. portions of 10% sodium chloride solution, at which point the washes were no longer alkaline. The ethyl acetate extract was then concentrated to dryness and the brown gummy residue (58 g.) refluxed for one hour with 300 ml. of t-butyl alcohol containing 5% by weight thereof of sodium hydroxide. The alkali was neutralized by the addition of dilute acetic acid and the t-butyl alcohol recovered by distillation under vacuo.

The residue was extracted with 300 ml. of boiling methanol, the extract filtered hot, and then concentrated to 75 ml. During the course of the concentration, crystals commenced forming. After cooling to room temperature and filtering 24.4 g. of $5\alpha$-16-pregnene-$3\beta$-ol-20-one was obtained as a pale yellow solid, M.P. 195–200° C.

Recrystallization of this product from methanol yielded 22 g. of white material, M.P. 202–205° C., and was identified as the subject compound by melting point comparison with an authentic sample.

*Example II*

The procedure as set forth in Example I up to the acetic anhydride addition was carried out, and then in lieu of the acetic anhydride, 50 ml. of n-ocetanoic acid and 10 ml. of n-octanoic anhydride were added to the dehydrated nitrobenzene solution and the mixture refluxed (with azeotropic water removal) for a period of 2 hours. Thereafter the mixture was cooled to below 50° C. and 300 ml. of cold water introduced with vigorous stirring for one hour following which the same treatment employed in Example I (i.e., chromic acid oxidation, etc.) was followed. In this instance the brown gummy residue resulting from the drying of the ethyl acetate extract weighed 64 g. Ultimately 21 g. of the same melting point steroid product was obtained.

*Example III*

In this example, the same plant residue, i.e., 1.25 kg. 20% moisture was first extracted with 2 liters of ethylene dichloride and the water content removed by azeotropic distillation. Thereafter the ethylene dichloride extract was filtered and the filtrate concentrated to dryness. The residue was then dissolved in 2 liters of nitrobenzene followed by the addition of 25 ml. of hydrazine and thereafter the same procedure as detailed in Example I was followed. 20 g. of product were ultimately obtained.

*Example IV*

To produce ticogenin acetate the procedure detailed in Example I up to the point of acetic anhydride addition was followed.

To the dewatered nitrobenzene solution was added 100 ml. of acetic anhydride, and the mixture heated at 100–120° C. for one hour, and thereafter cooled to below about 75° C. The acetic acid, nitrobenzene and any unreacted acetic anhydride were thereafter removed by steam distillation. The residue was extracted with ethyl acetate, washed with sodium carbonate solution, then with sodium chloride solution and then concentrated to a dry residue. The residue was recrystallized from ethyl acetate (or acetone or methanol) to yield tigogenin acetate with a melting point range of 204–208° C. The tigogenin acetate may be saponified by conventional procedures (e.g. NaOH in t-butyl alcohol or other lower alkanol) to yield free tigogenin.

What is claimed is:

1. The procedure for recovering tigogenin acetate from natural plant sources which comprises the following steps:
   (a) dissolving the steroid content of autolyzed and fermented dried plant residue in nitrobenzene;
   (b) treating the nitrobenzene solution with hydrazine hydrate, then with caustic aqueous diethylene glycol, followed by heating under conditions which vaporizes the water content and any unreacted hydrazine, thereby removing any carbonyl groups from the dissolved steroid;
   (c) treating the nitrobenzene solution with water and decanting off the caustic water layer, thereby removing fats and pigments from the nitrobenzene solution, thereafter dehydrating by vaporizing the water content;
   (d) treating the anhydrous nitrobenzene solution with acetic anhydride at a temperature in the range of 100–120° C., then steam distilling the solution to remove thereby unreacted acetic anhydride, acetic acid and the nitrobenzene;
   (e) recovering the tigogenin acetate from the steam distillation residue.

2. The procedure of claim 1 wherein the plant residue is initially extracted with a solvent selected from the group consisting of ethylene dichloride, tri-chlorethylene; perchlorethylene, mixtures thereof, and nitrobenzene under conditions where the water content of the plant residue is azeotropically vaporized, condensed solvent vapors being returned to the extraction.

3. The procedure for recovering $5\alpha$-16-pregnene-$3\beta$-ol-20-one from natural plant sources which comprises the following steps:
   (a) dissolving the steroid content of autolyzed and fermented dried plant residue in nitrobenzene;
   (b) treating the nitrobenzene solution with hydrazine hydrate, then with caustic aqueous diethylene glycol, followed by heating under conditions which vaporizes the water content and any unreacted hydrazine, thereby removing any carbonyl groups from the dissolved steroids;
   (c) treating the nitrobenzene solution with water and decanting off the caustic water layer, thereby removing fats and pigments from the nitrobenzene solution, thereafter dehydrating by vaporizing the water content;
   (d) treating the anhydrous nitrobenzene solution with an anhydride of a 2–12 carbon aliphatic acid at temperatures in excess of about 180° C., then cooling and adding water to the solution;
   (e) treating the cooled water containing mixture with chromic acid and acetic acid, then steam distilling the mixture to remove therefrom the nitrobenzene and other volatile constituents;
   (f) treating the steam distillation residue to saponify the steroid content thereof and to recover therefrom $5\alpha$-16-pregnene-$3\beta$-ol-20-one.

4. The procedure of claim 3 wherein the plant residue is initially extracted with a solvent selected from the group consisting of ethylene dichloride, tri-chlorethylene; perchlorethylene, mixtures thereof, and nitrobenzene under conditions where the water content of the plant residue is azeotropically vaporized, condensed solvent vapors being returned to the extraction.

5. The procedure of claim 3 wherein step (d) is effected with acetic anhydride.

6. The procedure of claim 3 wherein step (d) is effected with n-octanoic anhydride.

7. The procedure of claim 3 wherein step (f) involves
   (i) extracting the residue with ethyl acetate, washing the extract with aqueous sodium carbonate then with aqueous sodium chloride, thereafter distilling off the ethyl acetate;
   (ii) refluxing the extract residue with caustic t-butyl alcohol, neutralizing the alkali and evaporating to dryness;
   (iii) then extracting the residual solid with methanol, filtering, concentrating, then cooling, whereby crystaline $5\alpha$-16-pregnene-$3\beta$-ol-20-one is obtained.

No references cited.

LEWIS GOTTS, *Primary Examiner.*
ELBERT ROBERTS, *Assistant Examiner.*